3,554,919
ION-EXCHANGE COMPOSITIONS
Monte H. Rowell, 777 Meadowsweet Drive, Apt. 219,
Corte Madera, Calif. 94925
No Drawing. Filed Oct. 26, 1967, Ser. No. 678,173
Int. Cl. B01j 1/04; C02b 1/16, 1/44
U.S. Cl. 252—179                                          4 Claims

ABSTRACT OF THE DISCLOSURE

Improved ion-exchange compositions and the process for preparation thereof which are suitable for ion-exchange or chromatographic separation of cation solutes in fused salts.

BACKGROUND OF THE INVENTION

A number of inorganic solids have been investigated previously regarding their suitability for ion-exchange or chromatographic separations of cation solutes in fused salts. The materials include natural mineral zeolites, synthetic zeolites, porcelain, silica gel, powdered Pyrex glass, γ-alumina, zirconium silicate, zirconium phosphate, glassfiber paper, and glass-fiber paper impregnated with zirconium phosphate, zirconium oxide, and γ-alumina. Exchange of alkali ions has also been observed between molten alkali salts and certain minerals. The alkali ions in most glasses are exchangeable, and an extensive investigation has been made of the exchange of ions between melts and silicate glass. Practical use has been made of fused-salt ion exchange for the strengthening of glasses, but the slow rate of ion diffusion in most glasses makes them inefficient ion exchangers for chemical separation purposes. While all of the materials mentioned herein perform in certain applicatons as ion exchangers or chromatographic absorbents, none has been shown to be as generally effective with fused salts as organic resin exchangers are with aqueous solutions. They also lack the wide latitude of formulation possible with resins, a latitude that allows exchangers to be tailor-made to fit specific purposes. Unfortunately, however, resins are unstable at most fused salt temperatures. The present invention provides salt-saturated borate glass compositions which are satisfactory for ion-exchange separation of solutes. These new compositions behave like the resin exchangers but are effective at fused-salt temperatures whereas the resin exchangers are not.

SUMMARY OF THE INVENTION

The ion-exchange composition of this invention is typically composed of a glass based upon boron oxide as the primary network former, an alkali oxide as the primary network modifier and an alkali salt as the network extender. The alkali salt is used to increase the ion-exchange kinetics.

The general object of this invention is to provide ion-exchange compositions which are useful at extremes of temperature and radiative conditions where other solid particulate ion-exchange materials break down. Another object is to provide a process for the preparation of compositions which possess extraordinarily high capacity to remove ions from fused-salt solvents. Yet another use of the new ion-exchange glass compositions is the removal of radioactive ions, e.g., cesium, strontium, europium, uranium, plutonium and americum, etc., from nonaqueous media at high temperatures. Still another object is to provide an ion-exchange composition which can be fabricated into shapes which would allow its ion-exchange properties to be used in such articles as ion-exchange membranes and selective electrodes. A variety of other uses is apparent from a study of the unique properties possessed by the new compositions as set out herein.

DESCRIPTION OF THE INVENTION

In general the ion-exchange compositions were prepared by melting together in a large platinum crucible weighed mixtures of reagent grade chemicals chosen from the following: anhydrous boron oxide, anhydrous borax, powdered silica, sodium oxide, lithium oxide, potassium oxide, sodium metaphosphate, sodium chloride, lithium chloride, potassium chloride, sodium sulfate, potassium sulfate, sodium nitrate, lithium nitrate, potassium nitrate, sodium bromide and sodium iodide. The materials selected were heated to about 900° C. until a clear melt resulted. Heating continued until bubbling had ceased, then the melt was poured, cooled, crushed, and sieved to a variety of particle size fractions.

The following example will serve to illustrate further the method of making the compounds of this invention and the tests employed to determine the value in the fused salt ion-exchange systems.

EXAMPLE

| Ingredients: | Percent composition by weight |
|---|---|
| Sodium oxide | 21.8 |
| Boron oxide | 60.2 |
| Sodium chloride | 18.0 |

The above ingredients were mixed and heated together to a molten mixture at about 900° C. When the mixture stopped bubbling it was poured into a container and cooled. Then the material was crushed and sieved into a variety of particle size fractions.

By this process alkali metal salts selected from the group consisting of sodium, lithium, and potassium chlorides, and sulfates have been successfully used to saturate the borate glass compositions. A borate glass ion exchanger is loaded with a salt which is stable at the temperature at which the glass is prepared, the amount of loading ranging up to the saturation solubility of such salt in the molten glass at the temperature employed. If it is desired to load the glass with a salt (e.g., a nitrate) which is thermally unstable at the preparation temperature of the glass, the glass must first be loaded with a thermally stable salt (e.g., a chloride or sulfate) and this latter salt replaced with the less stable salt by contacting the loaded glass with sufficient melt of the less stable salt at a lower temperature.

As may be expected, the smaller particle size of the exchange composition improves the rate at which equilibrium is approached when the ion-exchange compound is brought into contact with the fused salt carrying the cation solute.

To test the ion-exchange property of these compositions an examination was made of the completeness of exchange equilibrium, the rate at which equilibrium was approached, and the feasibility of column operation. The equilibration procedure is as follows:

The ion exchange composition was contacted with molten sodium nitrate in which was dissolved a salt of either sodium, cesium, calcium, strontium, barium, or europium. Solute concentrations varied from 1 to 250 p.p.m. and contained gamma-emitting radioactive isotopes of the respective solute element to facilitate measurement of the solute distribution. The melt and exchanger were equilibrated by stirring for specified periods of time at temperatures controlled to ±5° C. The phases were separated, weighed, and radio assayed for gamma activity. From the specific activities of the two phases the distribution coefficient, $K_d$, was calculated:

$$K_d = \frac{\text{specific activity of glass phase}}{\text{specific activity of salt phase}}$$

The foregoing procedure measured the $K_d$ for uptake by the new compound since the radioactive tracer started in the salt sodium nitrate phase. To measure the $K_d$ for desorption, the compound containing solute was placed in a tube with fresh sodium nitrate and the procedure was repeated from there on. This was done whenever sufficient activity had been taken up by the ion-exchange compound phase to provide acceptable counting statistics for the reequilibrated phases.

The glass exchangers may be used in the form of columns to selectively remove ions from solution in a melt. Cobalt has been removed by such a column from a solvent of molten $LiNO_3$–$KNO_3$ and was subsequently eluted from the column by $LiNO_3$–$KNO_3$ containing small amounts of LiCl and KCl. This serves to illustrate the effect of certain anions on the distribution coefficients of certain cations which tend to form coordination complexes with those anions. In this case, cobalt is forming a complex ion with chloride, e.g. $CoCl_n^{2-n}$. The situation described here is analogous to the usual practice of passing an aqueous solution of a complexing agent through a column of a conventional ion-exchange resin in order to selectively elute adsorbed ions.

Using the equilibration test described herein Table I below shows the rate of exchange of sodium, starting as a tracer in molten sodium nitrate and two ion-exchanger compounds, one (A) containing sodium oxide ($Na_2O$), boron oxide ($B_2O_3$), and silicon dioxide ($SiO_2$) and the other (B) consisting of sodium oxide and boron oxide. It may be seen that the exchange rate is slow.

TABLE I.—EXCHANGE OF SODIUM (Na) IN MOLTEN SODIUM NITRATE ($NaNO_3$) AND TWO ION-EXCHANGE GLASS COMPOSITIONS A AND B (32–42 MESH) AT 450° C.

| Ion-exchange glass composition | Equilibration time | $K_d$ adsorption | Theoretical [a] ($K_d$) | Percent of theoretical equilibrium reached |
|---|---|---|---|---|
| A { 10 $Na_2O$ / 75 $B_2O_3$ / 15 $SiO_2$ | 55 min | 0.0125 | 0.252 | 5.0 |
| | 2.5 hr | 0.0206 | 0.252 | 8.1 |
| | 6.0 hr | 0.0356 | 0.252 | 14.1 |
| B { 21.3 $Na_2O$ / 78.7 $B_2O_3$ | 45 min | 0.110 | 0.533 | 21 |
| | 2.0 hr | 0.155 | 0.533 | 29 |
| | 5.0 hr | 0.219 | 0.533 | 41 |

[a] Calculation on the basis of the stoichiometry of Na in the two phases assuming complete exchangeability.

Using the composition disclosed in the example herein Table II below compares the exchange rate of sodium (Na) in molten sodium nitrate ($NaNO_3$) and two different particle size of the new sodium chloride-saturated borate ion-exchange composition. As expected, the smaller particle size of exchanger improved the rate of equilibrium as does saturation of the borate ion-exchanger with salt (sodium chloride) proved to be a very successful method of preparing ion-exchange borate glasses with improved kinetic properties.

TABLE II.—RATE OF SODIUM (Na) EXCHANGE AT 500° C
[Ion-Exchange Glass Composition: 21.8 $Na_2O$, 60.2 $B_2O_3$, 18.0 NaCl]

| Equilibration time | 32–42 mesh ($K_d$) | | 65–100 mesh ($K_d$) | |
|---|---|---|---|---|
| | Adsorption | Desorption | Adsorption | Desorption |
| 45 min | .65 | 1.87 | .765 | .82 |
| 2.0 hr | .68 | 1.57 | .760 | 1.11 |
| 5.0 hr | .72 | 1.04 | .723 | .73 |

Table III below shows the rate of equilibration of strontium in the sodium chloride saturated borate composition described in the example. Two different temperatures were used, and the $K_d$ values for adsorption and desorption are only fairly close at 450° C. but when the temperature was increased to 550° C., the 30-minute desorption $K_d$ was very close to the two-hour adsorption $K_d$ at 450° C.

TABLE III.—RATE OF EQUILIBRATION OF STRONTIUM WITH 80–115 MESH ION-EXCHANGE
[Composition: 21.8 $Na_2O$, 60.2 $B_2O_3$, 18.0 NaCl]

| Temperature (° C) | $K_d$ | |
|---|---|---|
| | Adsorption | Desorption |
| Equilibration time: | | |
| 30 min — 450 | 122 | 634 |
| 30 min — 550 | | 204 |
| 1.0 hr — 450 | 167 | 365 |
| 2.0 hr — 450 | 191 | 572 |

In Table IV following, the $K_d$ values are compared between the solid salt-saturated ion-exchanger in a molten sodium nitrate system containing cesium, sodium, barium, strontium, and europium, and the same salt-saturated exchanger in a liquid phase with a molten sodium chloride system containing the same trace elements as in the sodium nitrate. The order of selectivity for solutes (the trace elements) is the same in both systems, but the degree of selectivity appears greater in the solid ion-exchanger-molten sodium nitrate system.

TABLE IV.—SOLID ION-EXCHANGE COMPOSITION IN MOLTEN SODIUM NITRATE VS. LIQUID ION-EXCHANGER COMPOSITION IN MOLTEN SODIUM CHLORIDE ION-EXCHANGER COMPOSITION: 21.8 $Na_2O$, 60.2 $B_2O_3$, 18.0 NaCl
[80–115 Mesh Solid in $NaNO_3$ at 550°; Liquid in NaCl at 830°]

| Solute | $K_d$ (adsorption) | Equilibration time, hr. | $K_d$ (desorption) | Equilibration time, hr. | $K_d$ (equilibrium) |
|---|---|---|---|---|---|
| $Cs^+$ | .0015 | ½ | | | .26 |
| $Na^+$ | [a] .84 | | [a] .84 | | .55 |
| $Ba^{2+}$ | 1.6 | ½ | 17 | 1 | 2.2 |
| $Sr^{2+}$ | [b] 191 | 2 | 204 | ½ | 5.7 |
| $Eu^{3+}$ | 3,090 | 1 | 4,000 | 1 | 2,600 |

[a] Calculated from analysis of macro constituents.
[b] 450°.

The results set out herein show that the ion-exchange kinetics of the borate glass compositions are improved by the inclusion of sodium chloride. Other alkali salts such as sodium sulfate, lithium chloride and sodium nitrate, and potassium chloride were also included in the borate glass and mixed in accordance with the process described. Table V below shows some distribution coefficients for cesium, barium, and europium between molten sodium nitrate and each of two ion-exchange compositions defined in the table and designated C and D. When exchangers loaded with these salts were used with nitrate co-phases, subsequent analyses showed the loading salts to be largely replaced by nitrate during equilibration.

TABLE V.—DISTRIBUTION COEFFICIENTS BETWEEN ION-EXCHANGE COMPOSITIONS C AND D DEFINED BELOW AND MOLTEN SODIUM NITRATE WITH TRACE SOLUTES

| Ion-exchange composition | Solute | Equilibration time, hr. | $K_d$ Adsorption | Desorption |
|---|---|---|---|---|
| C. $Na_2O \cdot 3B_2O_3$ | $Cs^+$ | ½ | .0013 | |
| | $Cs^+$ | 1 | .0011 | |
| | $Ba^{2+}$ | ½ | .43 | 10.4 |
| | $Ba^{2+}$ | 1 | .49 | 13.5 |
| | $Eu^{3+}$ | ½ | 1,400 | 4,000 |
| | $Eu^{3+}$ | 1 | 600 | 2,000 |
| D. $Na_2O \cdot 3B_2O_3$ saturated with $Na_2SO_4$. | $Cs^+$ | ½ | .00056 | |
| | $Cs^+$ | 1½ | .00077 | |
| | $Ba^{2+}$ | ½ | .61 | 29.6 |
| | $Ba^{2+}$ | 1½ | .59 | 30.9 |
| | $Eu^{3+}$ | ½ | 100 | 700 |
| | $Eu^{3+}$ | 1½ | 2,000 | 7,000 |

In the ion-exchange glass compositions before they are saturated with an alkali salt according to the procedure described herein boron oxide, the networker former, must constitute the greater portion and generally ranges from 30 to 95 molar percent. The alkali oxides (sodium oxide, potassium oxide and lithium oxide) which are the primary network modifiers, each range up to 40 molar percent and mixtures thereof from 5 to 40 percent. Other ingredients such as silicon dioxide ($SiO_2$) and phosphorus pentoxide are often include in small amounts.

The above described salt-loaded glasses are intended primarily for use as solid ion exchangers in the approximate temperature range of 150° C.–600° C. The upper and lower limits of the temperature range are determined, respectively, by the softening point of the glass composition and the melting point of the solvent salt. Solvent salts most useful in this temperature range are the alkali nitrates and their mixtures and mixtures of alkali halides and/or sulfates, the proportions of which being such that the melting point is below the softening temperature of the glass exchanger. The upper temperature limit may be extended somewhat by adjusting the glass composition to include more $SiO_2$ or some alkaline earth oxides as modifiers.

Above its softening temperature, an ion-exchange glass retains its ion-exchange capability, but becomes impractical to handle. When heated to sufficiently low viscosity, however, it may be used as a liquid ion exchanger. This usually requires a temperature in excess of 750° C. Higher melting salts, such as pure halides or sulfates, may then be used as the co-phase. The salt in the exchanger phase will then of course exchange with the co-phase until equilibrium is reached.

From these results it is obvious that the kinetics of salt-saturated borate ion-exchange compositions are satisfactory for ion-exchange separation of solutes. Such compounds in molten salts behave like resin exchangers with a high degree of electrolyte invasion, except that the rigid network structure does not swell and contract. Also, these new compositions do not show severe hysteresis effects as do zeolites.

In high-alkali borate compositions, both molten and vitreous, the selectivity sequence for alkali, alkaline-earth, and rare-earth cations is in the order of increasing field strength of the cation. The sequence is the same, whether the anion in the melt is nitrate or chloride. The manner in which borate glasses (ion-exchange compounds) show selectivity toward cations is probably the result of the special nature of the functional groups in the borate network.

In the improved ion-exchange glass compounds disclosed herein the diffusion rate is probably increased by dissolved salt for two reasons: first, the rigid glass network is expanded, increasing the size of the spaces through which ions can migrate, and second, the charges of the migrating ions are better screened, reducing the coulombic forces to be overcome. A particular glass can accommodate up to a certain amount of salt without the tendency toward phase separation. Because glasses, unlike resins, cannot swell up to accommodate invading electrolytes, they cannot take up this amount of salt from a melt. Instead, salt must be dissolved in the glass while both are molten. It is usually desirable to dissolve in the glass exchanger the same salt which is to be the co-phase carrying the trace elements, since the co-phase salt will tend to replace the salt in the exchanger anyway.

Obviously many modifications and variations of the present invention are possible in the light of the above teachings. It is, therefore, to be understood that within the scope of the appended claims the invention may be practiced otherwise than as specifically described.

Government interest.—The invention described herein may be manufactured and used by or for the Government of the United States of America for governmental purposes without the payment of any royalties thereon or therefor.

What is claimed is:
1. An ion-exchange composition comprising
   boron oxide in major amount as the primary network former,
   an alkali oxide as the primary network modifier, and
   an alkali salt as the network extender.
2. The process for the preparation of the composition of claim 1 which comprises
   dissolving said alkali salt in an amount up to saturation in a mixture comprising in major portion said boron oxide and the remainder said alkali oxide.
3. The composition of claim 1 wherein the alkali oxide is a member selected from the group consisting of sodium, lithium and potassium oxide and the alkali salt is a member selected from the group consisting of sodium chloride, lithium chloride, potassium chloride, sodium sulfate, lithium sulfate, potassium sulfate, sodium nitrate, potassium nitrate, lithium nitrate, sodium bromide, sodium iodide and mixtures thereof.
4. The composition of claim 1 wherein the alkali oxide is sodium oxide and the alkali salt is sodium chloride.

References Cited
UNITED STATES PATENTS

| | | | |
|---|---|---|---|
| 2,283,172 | 5/1942 | Bates | 252—179X |
| 2,917,368 | 12/1959 | Juda | 210—24X |
| 2,943,059 | 6/1960 | Beck et al. | 252—179 |
| 3,196,106 | 7/1965 | Haden et al. | 210—24 |
| 3,250,725 | 5/1966 | Vescovi | 252—432X |
| 3,271,323 | 9/1966 | Whittemore | 252—432 |
| 3,328,119 | 6/1967 | Robson | 252—432X |
| 3,428,568 | 2/1969 | Harker et al. | 252—179X |

HAROLD ANSHER, Primary Examiner

M. E. McCAMISH, Assistant Examiner

U.S. Cl. X.R.

210—24, 38; 252—432